United States Patent [19]

Wuethrich

[11] Patent Number: 5,681,027
[45] Date of Patent: Oct. 28, 1997

[54] INSERTABLE TYPE SAFETY COUPLING FOR PRESSURE PIPES

[75] Inventor: Albrecht Wuethrich, Wolhusen, Switzerland

[73] Assignee: Hans Oetiker AG Maschinen und Apparatefabrik, Switzerland

[21] Appl. No.: 307,676
[22] PCT Filed: Jan. 18, 1994
[86] PCT No.: PCT/CH94/00008
    § 371 Date: Oct. 30, 1995
    § 102(e) Date: Oct. 30, 1995
[87] PCT Pub. No.: WO94/17322
    PCT Pub. Date: Aug. 4, 1994

[30] Foreign Application Priority Data

Jan. 22, 1993 [CH] Switzerland ............ 00191/93
Apr. 19, 1993 [CH] Switzerland ............ 01192/93

[51] Int. Cl.⁶ ............................................. F16L 37/28
[52] U.S. Cl. ........................... 251/149.2; 251/149.9; 137/616.7
[58] Field of Search ................ 251/149.2, 149.9; 137/616.7; 285/184, 907

[56] References Cited

U.S. PATENT DOCUMENTS 4,662,396  5/1987  Avnon ........................ 137/616.7
4,905,965  3/1990  Dolev ........................ 251/149.9
5,050,841  9/1991  Jacobsson .................... 251/149.9
5,326,072  7/1994  Wuthrich .

FOREIGN PATENT DOCUMENTS 8711334  10/1987  Germany .
1503647   3/1978  United Kingdom .
8907222   8/1989  WIPO .
9324781  12/1993  WIPO .

*Primary Examiner*—Kevin Lee
*Attorney, Agent, or Firm*—Speckman, Pauley & Fejer

[57] ABSTRACT

A plug-in safety coupling for pressure lines including a coupling socket (1) having a blocking member (3) pivotally mounted therein and a plug (2) insertable therein for pressureless coupling and uncoupling. The blocking member (3) is secured against pivotation at least in the flow position by means of at least one bolt or cam. The bolt or cam (67) is displaceably guided at the coupling socket (1), and in the blocking position engages into a bore or a recess in the blocking member (3). The blocking member (3) has a through bore extending perpendicularly to its pivotal axis into which an adapter (4) having a through bore, is insertable and fits tightly and sealingly and where an internal surface of the adapter (4) is shaped to receive the plug (2) to be inserted.

21 Claims, 5 Drawing Sheets

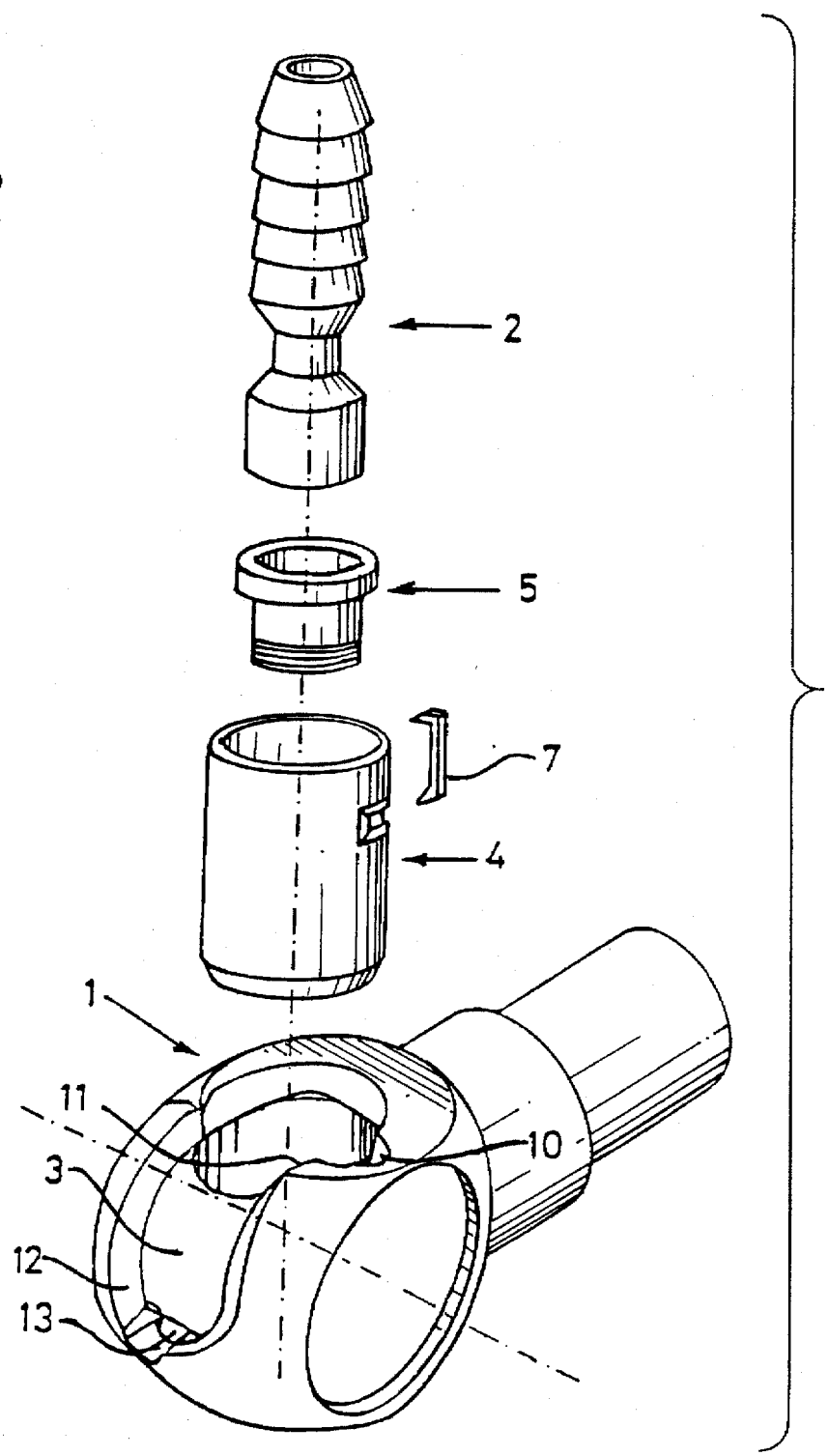

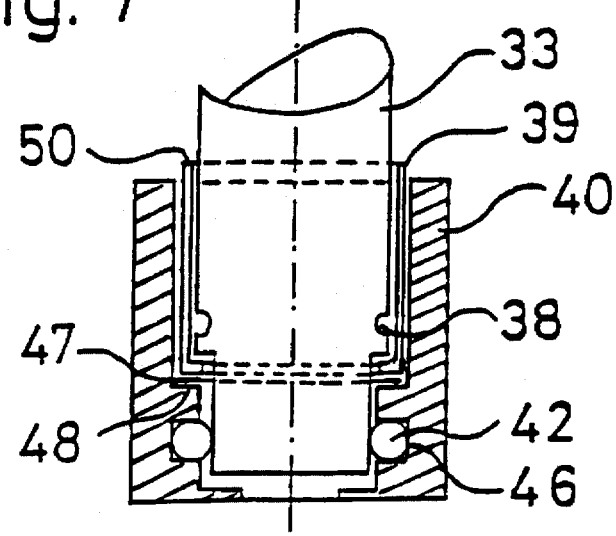
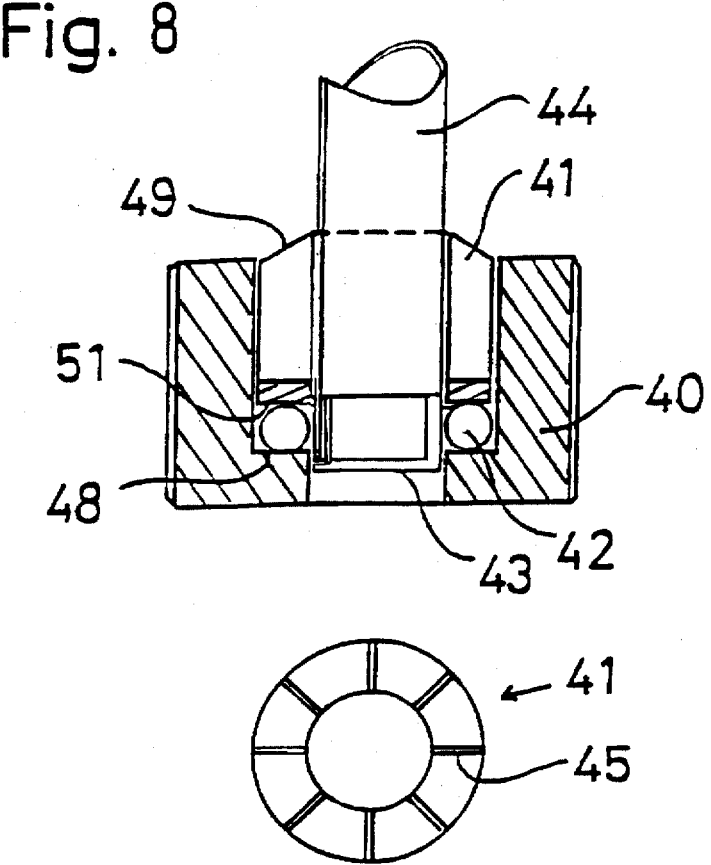

INSERTABLE TYPE SAFETY COUPLING FOR PRESSURE PIPES

BACKGROUND OF THE INVENTION

1. Field of the Invention

This invention relates to a plug-in safety coupling for liquid or gas pressure lines. The coupling comprises a coupling socket with a blocking member pivotally mounted therein, and forms a coupling sleeve, and a coupling plug that fits within the coupling sleeve.

2. Description of Prior Art

Conventional couplings for pressures lines generally comprise a coupling plug, a socket, a mechanism for locking the coupling in the flow position so the socket and the plug are held together, and a blocking device, which prevents the escape of the pressurized medium when the coupling is released. When the coupling plug is inserted into the socket, the blocking function of the coupling is disabled and the medium can flow through the coupling. When the coupling is disengaged, the flow is blocked once again.

In one particular type of known coupling for pressure lines, a pivotable blocking member has a coupling sleeve. In the disengaged position of the coupling, the blocking member is pivoted and blocks the flow of the medium. A coupling plug can be inserted at an angle to the pressure line into the blocking member, which is mounted pivotally in a coupling socket. The coupling is brought into a flow position by pivoting the coupling plug and the blocking member in the coupling socket. When the plug has reached the flow position, it is secured in this position by the pressure existing in the pressure line, which causes the plug to partially move out of the socket and into a recess in the coupling socket, so that the plug cannot be pivoted any farther. When disengaging a coupling having a pivotable blocking member such as this, the coupling socket must be pressed against the line pressure, so the plug comes out of the recess in the coupling socket and can then be pivoted, which will block the flow of the pressurized medium. In the pivoted position, a pressure compensation between the coupling plug to be disengaged and the surroundings is achieved by a relief opening in the coupling housing. After the pressure is relieved, the plug can be pulled out of the coupling socket. In comparison to widely used couplings not having a relief opening, and which during uncoupling can be thrown out of the socket because of pressure still existing in the plug, these couplings basically are safe in handling and assist in preventing accidents.

A considerable problem which prevents a wider acceptance of such couplings having a pivotable blocking member, is the fact that uncoupling the plug requires that the plug be pushed against the line pressure into a coupling sleeve before it can be pivoted. Pushing the plug against the line pressure requires the application of a noticeable force in the case of couplings with larger dimensions, as well as for couplings with high line pressures. This force complicates the handling of the coupling and can even prevent its use.

Another reason why such couplings, notwithstanding their safety advantages, have not been more widely used, is because there are a multitude of standard plugs or couplings of pressure lines, which vary diametrically and are in common use. This means that a particular plug can only be used with a suitably fitting coupling sleeve. Because the blocking member itself forms the coupling sleeve, a unique blocking member is required for each plug type. If a different plug type is to be used, then one is forced to replace either the entire coupling socket and blocking member or, to fit a blocking member suitable for the coupling plug in the existing coupling socket. It would be far too expensive to construct a multitude of different blocking members to adapt to the different available plug types. Blocking members are produced by means of turning and milling by automatic machines and should be produced in quantities as large as possible in order to keep their price low.

SUMMARY OF THE INVENTION

Therefore it is one object of this invention to create a plug-in coupling having a pivotable blocking member which can be uncoupled comfortably without requiring a high force or pressure, and which has a blocking member that is simple and is cost effective to manufacture for any coupling plug and consequently can be used with different standard plugs already in use in large quantities.

This object is achieved by a plug-in safety coupling for pressure lines with a coupling socket having a blocking member pivotally mounted therein. The blocking member has a diametrical through bore, and a plug insertable therein for pressureless coupling and uncoupling. The blocking member is lockable against pivoting in the flow position by means of at least one displaceable bolt or cam which engages a bore or a recess in the blocking member. The blocking member has a recess arranged perpendicular to the blocking member's pivotal axis and arranged about the blocking member's through bore, into which an adapter with a through bore is inserted form-fittingly and sealingly. The interior of the adapter forms a coupling sleeve for the insertable plug.

Additional preferred embodiments in accordance with this invention are clear from the dependent claims, and their respective construction is explained in the description thereafter by means of the drawings.

A blocking mechanism with displaceable cam(s) or bolt(s) can be designed in many different ways. Also, both the blocking member and the adapter, which is insertable into the blocking member, can be made in various forms. Thus, the blocking member can be cylindrical, spherically shaped or conical. Similarly the outer perimeter of the adapter can be of different shapes, including cylindrical, cubical or elliptical.

BRIEF DESCRIPTION OF THE DRAWINGS

Preferred embodiments of couplings, blocking members and adapters according to this invention are illustrated by way of the drawings, wherein:

FIG. 2 shows an exploded perspective view of the coupling elements in accordance with one embodiment of this invention, including the coupling socket, the blocking member assembled therein, the adapter and its attachment screw and a plug;

FIG. 7 shows a partial cross-sectional view of an adapter for a short plug in accordance with one preferred embodiment of this invention; and FIG. 8 shows a partial cross-sectional view of an adapter with a tension clamp for a direct hose connection in accordance with one preferred embodiment of this invention.

DESCRIPTION OF PREFERRED EMBODIMENTS

Figure 1:
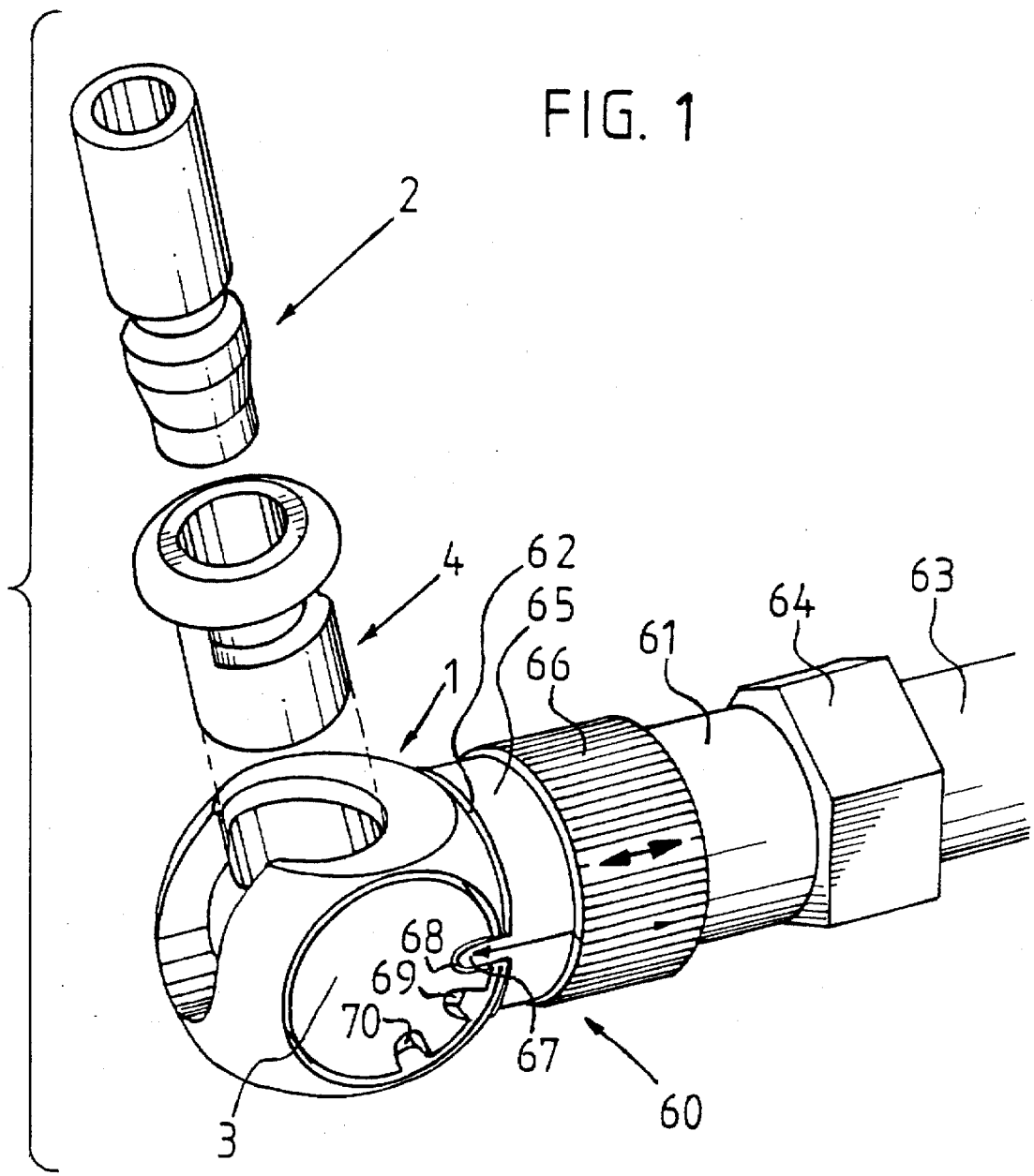
FIG. 1 shows one preferred embodiment of a coupling socket in accordance with this invention having a pivotable blocking member, an adapter and associated plug and a locking mechanism comprising an axially displaceable ring with edge cams, which engage the blocking member.

FIG. 1 shows a particularly elegant but simple preferred embodiment of this invention. The individual elements of the coupling are shown in a partially exploded view. This embodiment comprises a coupling socket 1, in which a pivotable blocking member 3 is disposed. This blocking member 3, which is cylindrical, has a bore extending diametrically through the blocking member 3 perpendicular to its pivotal axis. The bore has a larger diameter in a first region to form a recess into which an adapter 4 fits exactly. The interior of adapter 4 forms a plug sleeve which is adapted to a particular plug type. The associated plug 2 is shown above the adapter 4. The adapter 4 is sealed off relative to the recess in the blocking member 3, which will be described in more detail hereafter. Various adapters for use with other plug types can be fitted to the blocking member 3. In this way, the coupling with the blocking member 3 can be applied universally for different plug types. The blocking mechanism is of primary importance. The blocking mechanism ensures that the coupling, when in the flow position, will not uncouple unintentionally from the coupling socket 1. Conventional couplings having a pivotable blocking member have a plug which is forced by the existing line pressure, and slightly pushed out of the coupling socket and into the precisely fitting recess present in the coupling socket, so that the plug cannot be pivoted any farther. Unlike such a conventional coupling, the plug according to this embodiment of the invention remains undisplaced in the coupling socket 1 when in the flow position. The blocking member 3 is prevented from pivoting and is secured in the flow position by means of at least one bolt or cam 67. The bolt or cam 67 is displaceably led along the coupling socket 1 and engages a bore or recess 68, 69, 70 in the blocking member 3. In the preferred embodiment of this invention shown in FIG. 1, this is realised by means of a ring 60, which is seated axially displaceably behind the coupling socket 1 on a nipple 61, which is connected to the coupling socket 1 and which connects the coupling socket 1 to a pressure line 63. The nipple 61 can carry an internally threaded collar 64 on an end portion, so that the coupling can be threadedly engaged with an external thread of the pressure line 63. It may, however, alternatively be screwed directly by means of an outer thread in an end sleeve of the pressure line 63. The ring 60 can have zones 65, 66 of different diameters. The zone 66 has a larger diameter with a serrated or knurled surface, so that it can be gripped without slipping. Zone 65 has a smaller diameter than zone 66, and has an edge 62 facing towards the coupling socket 1. Zone 65 has two cams 67 projecting beyond the edge 62. The ring 60 is axially displaceable on the nipple 61, and is urged towards the coupling socket 1 by a spring. An internal surface of the ring 60 and an external surface of the nipple 61 each have a shoulder. Between these shoulders a pressure spring is fitted. This pressure spring produces the force which urges the ring 60 in a direction towards the coupling socket 1. However, the ring 60 can also be moved reasonably easily by hand against the spring force, when necessary. The coupling socket 1 has recesses opposite the cam 67 which the cam 67 can engage. Simultaneously the blocking member 3, which in this preferred embodiment is cylindrical, has radial bores 68, 69, 70 distributed across its circumference, into which the cam 67 can engage depending on the pivotal position of the blocking member 3. When so engaged, the blocking member 3 is secured and can not be pivoted. FIG. 1 shows the coupling in the position in which a plug 2 is inserted into or removed from an adapter 4. The adapter 4 has a through bore, and is inserted into the coupling socket 1. To pivot the couple to the flow position, the ring 60 is pushed back, which pulls the cams 67 out of the bores 68, 69, 70 on both sides of the blocking member 3, and which then allows the blocking member 3 to pivot in the coupling socket 1. The adapter 4 and the plug 2 are used to pivot the blocking member 3 into the flow position and the ring 60 is then released. The ring 60 is urged against the coupling socket 1 by the spring and the cams 67 engage the bores 68, 69, 70. In this position the coupling is safely locked. Uncoupling is accomplished by pushing the ring 60 back against the spring, which pulls the cams 67 out of the bores 68, 69, 70 and thus releases the blocking member 3 for pivoting. The plug 2 and adapter 4 are used to pivot the blocking member 3 out of the flow position. As the blocking member 3 pivots, the through bore in the blocking member 3 slides over a relief bore passing through the coupling socket 1. When the through bore in the blocking member 3 aligns with the relief bore, the cams 67 engage the bores 68, 69, 70 in the blocking member 3 if the ring 60 is released. In this position the plug interior is completely relieved of pressure. The ring 60 can then again be pushed back and the plug 2 and adapter 4 can be used to pivot the blocking member 3 into the position in which the plug 2 can be removed from the adapter 4, and in which the cams 67 again engage the bores 68 and thus secure the blocking member 3. The plug 2 can then be removed without pressure and the blocking member 3 is secured against unintended pivoting.

It will be obvious to one skilled in the art that the blocking mechanism can be achieved in many various ways. For example, the cams 67 can be designed to be non-visible, in that they may extend on the inner side of the ring 60 along the nipple 61 and can be covered by a jacket. In place of such cams 67 also one or more bolts can fulfill the same task. Such a bolt can be mounted displaceably on the nipple 61 in axial direction thereto and can be spring loaded and can engage suitable bores in the blocking member 3 by means of a suitable bore in the coupling socket 1.

FIG. 2 shows additional characteristics of a coupling with adapter pieces for the integral blocking member 3. The adapter pieces are sealingly in the coupling socket 1 by means of sealing elements relative to the pressure line. In accordance with one embodiment of this invention, an adapter 4 is applied in order to adapt the coupling socket 1 universally to any desired plug types. The adapter 4 is sealingly fitted in a suitable recess in the blocking member 3 and is attached by means of a threaded nipple 5 to a hexagonal socket. The inner shape of the adapter 4 forms a respectively suitable socket for a corresponding standard plug type. Thus, because a suitable adapter can be fitted for any plug type, the coupling socket can be applied universally. The form and the function of the adapter 4 is shown in detail in FIG. 2 according to one embodiment of this invention. A pin 7, which is fitted spring loaded in a recess in the blocking member 3, prevents a pivoting of the blocking member 3 unless plug 2 is first inserted. The pin 7 thus replaces the ring 60 and the cams 67 shown in FIG. 1.

By means of a pressure spring the pin 7 is pressed into a recess 10 in the coupling socket 1. If an attempt is made to pivot the blocking member 3, then the pin 7 engages against a housing edge 11. On insertion of the plug 2 into a coupling sleeve formed by the interior of the adapter 4, the pin 7 is pressed below the housing edge 11 of the coupling socket 1, so that the blocking member 3 can be pivoted unhindered.

On insertion of the plug 2 into the adapter 4 and by pivoting the blocking member 3, the coupling can be brought from a blocking position into a flow position. As soon as the plug 2 has reached the flow position, the plug 2 is pressed by means of the pressure existing in the pressure line into a recess 12 in the coupling housing 1 and is secured in this position. The plug 2 thus can not be pivoted any farther and the coupling therewith is locked. For unlocking, the plug 2 is pressed into the adapter 4. During subsequent pivoting of the plug 2, the blocking member 3 is again brought into the blocking position. The blocking member 3 passes over a relief opening 13, which creates a pressure compensation between the surroundings and the interior of the adapter 4. The plug 2 can then be pulled out of the adapter 4 pressureless.

Figure 3:
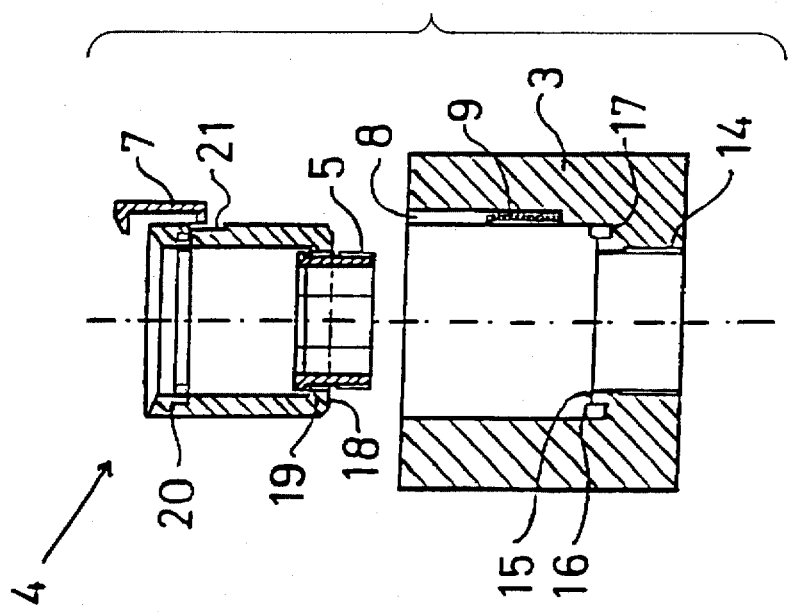
FIG. 3 is a cross-sectional view of a blocking member and an adapter according to another preferred embodiment of this invention.

FIG. 3 shows a section view of an adapter 4 and a blocking member 3, into which the adapter 4 can be inserted. The blocking member 3, which in this embodiment of the invention is cylindrical, has two concentric bores, which are arranged perpendicular to the blocking member's 3 pivotal axis. A larger bore has an internal diameter which corresponds to the outer diameter of the adapter 4. A smaller bore, joining concentrically to the larger bore, passes through the cylinder. The smaller bore is provided with a thread 14 for receiving a threaded nipple 5, to attach the adapter 4 in the blocking member 3. An annular groove 17 having an outer diameter equal to the internal diameter of the larger bore, is provided in a round circular step 15, which results from the transition of the large bore to the smaller concentric bore. A sealing element 16 is inserted into this annular groove 17. When the adapter 4 is inserted into the blocking member 3, a surface 18 is sealingly seated on the step 15 and the sealing element 16. The opening of the adapter 4 at the surface 18 is slightly smaller than the upper adapter opening. By means of the different opening radii, a shoulder 19 results, on which the threaded nipple 5 abuts. The internal diameter of the threaded nipple 5 is selected such that it corresponds to the internal diameter of the plug 2 to be inserted. Thereby it is ensured that, at the coupling position, no restriction in the through-flow cross-section results. In the interior of the adapter 4 and directly below the upper opening, a ring shaped sealing element 20 is located. The sealing element 20 sealingly surrounds the plug 2, as the plug 2 is inserted into the adapter 4. The pin 7, which is spring loaded, is inserted into the blocking member 3 in the recess 8, and engages a notch 21 in the adapter 4.

Figure 4:
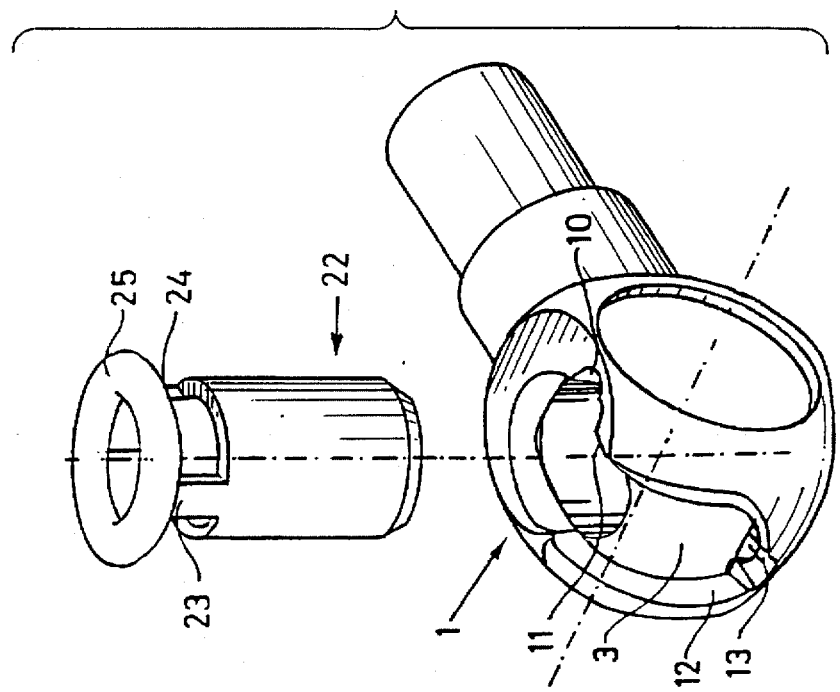
FIG. 4 shows an adapter with a guide for the coupling plug according to another preferred embodiment of this invention.

FIG. 4 shows another preferred embodiment of an adapter 22. A lower portion of the adapter 22 is seated in the blocking member 3, and is similar to a lower portion of the adapter 4 as described in FIG. 2 and FIG. 3. However, the adapter 22 shown here is different in that two windows are milled into an upper portion of the adapter 22. Two webs 23, 24 are formed by these two windows. On an upper edge of the adapter 22 is a torus shaped ring 25, which is seated on the webs 23, 24. The lengths of the webs 23, 24 depends on the applied plug type to be used with the adapter 22. The extension of the adapter 22 with the two webs 23, 24 and the torus shaped ring 25 provide the coupling socket with a better guide and greater stability, which is of advantage in particular during pivoting in larger coupling embodiments.

Figure 5:
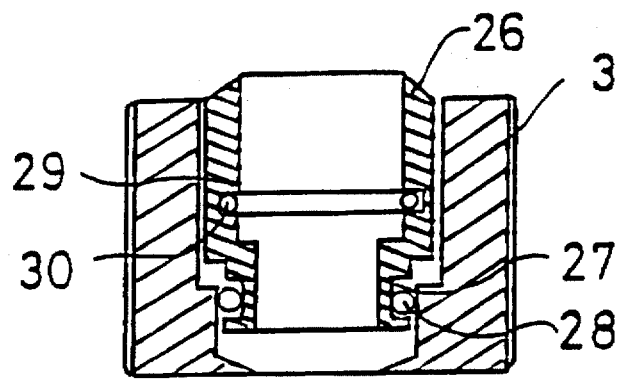
FIG. 5 shows a cross-sectional view of a blocking member and adapter in accordance with one preferred embodiment of this invention.

Another preferred embodiment of a blocking member having an adapter is shown in a cross-sectional drawing in FIG. 5. The cylindrical blocking member 3 has a bore perpendicular to the blocking member's 3 pivotal axis, which corresponds to the exterior diameter of the adapter 26 to be inserted. The bore narrows in the lower portion of the blocking member 3 by means of a step. The interior of the narrow portion of the bore serves as a sealing surface for the adapter 26. An annular groove 27 is recessed in an exterior of a lower portion of the adapter 26 the exterior of the adapter 26 also contains a step to match the interior of the blocking member 3. A sealing ring 28 for sealing the adapter 26 in the blocking member 3 is located in the annular groove 27. The adapter 26 is inserted in the blocking member 3 and is grasped by the sealing ring 28. The interior of the adapter 26 forms a sleeve coupling. An annular groove 29 is recessed in an interior of an upper portion of the adapter 26. A sealing ring 30 is located in the groove 29 for sealing the plug to be inserted.

Figure 6:
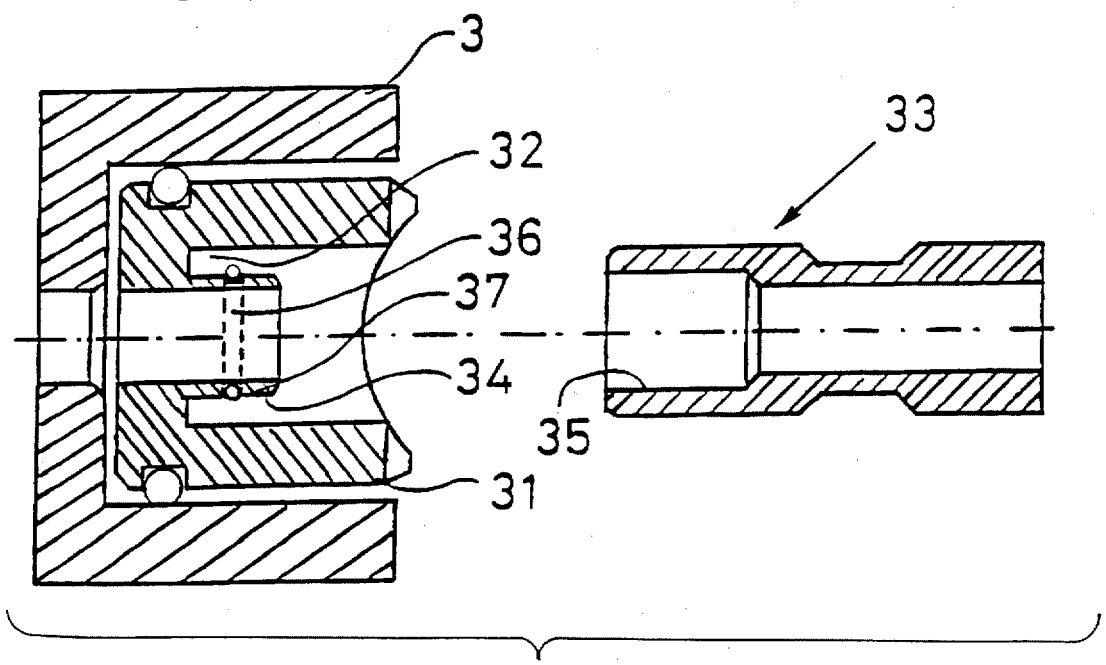
FIG. 6 shows a cross-sectional view of an adapter for a plug and socket in accordance with one preferred embodiment of this invention.

A safety coupling having an adapter in another preferred embodiment in accordance with this invention provides for a reduction of the force necessary when pressing together the plug and coupling socket for uncoupling the coupling. The cross-sectional area on which the inner pressure acts during uncoupling is reduced, and therefore the through flow quantity is reduced. A preferred embodiment for such a safety coupling having an adapter is shown in FIG. 6. The adapter 31 has two aligned axial bores having different diameters. An annular groove 32 is recessed around a nipple 34 which defines the smaller bore. The diameter of the annular groove 32 is defined by an interior surface of the adapter 31 which also defines the larger bore. The width and the depth of the annular groove 32 are selected such that a suitable plug 33 can be inserted and will fit exactly into the annular groove 32. The nipple 34 is to be as thin walled as possible, because the outer diameter of the nipple 34 determines the acting cross-sectional surface, which determines the force of the over pressure of the coupling which is necessary to be able to press the plug 33 into the adapter 31 against the media pressure. An inner, smooth surface 35 of the plug 33 forms a sealing surface. During pushing together of the coupling elements, the plug 33 is inserted so far into the annular groove 32 of the adapter 31 that a sealing element 37 located in a circular groove 36 of the nipple 34 presses sealingly against the plug interior surface 35. The exterior surface of the adapter 31 and the interior surface of the blocking member 3 are shaped similarly, as is the case with the corresponding coupling parts described in FIG. 5.

In the previously described preferred embodiments of an adapter according to this invention, the sealing element for sealing the plug relative to the adapter is located in the adapter and an internal surface of the plug forms a sealing surface. However, it is obvious that an internal surface of the adapter can be a sealing surface, and that the plug can have a groove with a sealing ring as a sealing element.

FIG. 7 shows another preferred embodiment of an adapter which is suitable particularly for short plugs, which can not engage in the coupling socket. In the cylindrical blocking member 40, which has a bore perpendicular to its pivotal axis, there is a sleeve 39. The sleeve 39 is pressed to the outside by means of a spring washer 47, which abuts a shoulder 48 in the blocking member 40. As a result thereof, an upper edge 50 of the sleeve 39 projects out of the blocking member 40 into a plug recess of the coupling socket and the blocking member 40 thus can not be pivoted. On insertion of a plug 33, the sleeve 39 is pressed so far into the blocking member 40 that the blocking member 40 can be pivoted in the coupling socket. As soon as the blocking member 40 is in the flow position, the plug 33 together with the sleeve 39 are pressed outwardly by means of the media pressure and the spring washer 47. The sleeve 39 then engages a recess in the coupling socket and thereby locks the blocking member 40. Only after pressing the plug 33 against the media pressure into the blocking member 40 can the blocking member 40 be brought unhindered from the flow position into the blocking position. A spring loaded stirrup, which is not shown in the drawing, is inserted into a recess in the blocking member 40. If the blocking member 40 is in the blocking position, then this stirrup is pressed by a spring to the outside against the inner wall of a coupling socket, and the plug 33 can be inserted unhindered. On pivoting the blocking member 40 from the blocking position into the flow position, this stirrup is pressed into the recess in the blocking member 40 and the legs of the stirrup then engage a plug recess 38. Thereby the plug 33 is fixed in the blocking member 40. The plug 33 is sealed off in the blocking member 40 by means of a sealing ring 42, which is inserted into a groove 46 in the blocking member 40. In another preferred embodiment of the adapter shown in FIG. 7 the spring washer 47 is replaced by a sealing ring. This sealing ring has the function of the aforementioned spring washer 47, namely to press the sleeve 39 outwardly, and also serves to embrace the inserted plug 33 sealingly. In this preferred embodiment, no further sealing element for sealing the plug is necessary.

FIG. 8 shows another preferred embodiment according to this invention of an adapter in which an end of a plastic or rubber tube 44 directly assumes the function of the plug of the safety coupling. A tension clamp 41 forms the adapter. The tension clamp 41 comprises a cylindrically shaped jacket with elongated slots 45. At an upper end 49 the tension clamp 41 is cortically shaped. A lower closing off surface 51 of the tension clamp 41 forms a sealing surface and abuts by means of a sealing ring 42 sealingly on a shoulder 48 of the blocking member 40. As the sealing ring 42 simultaneously acts as a spring, the tension clamp 41 is pressed to the outside. The conical end of the tension clamp 41 engages thereby into the coupling socket. On pivoting of the blocking member 40 with inserted tube 44 a suitably shaped recess in the coupling socket causes the conical head of the tension clamp 41 to be pressed into the blocking member 40. The tension clamp 41 is radially pressed together by means of its conical shape and thus surrounds the tube 44 tightly. If an attempt is made to pull the tube 44, or if the tube 44 is pressed outwardly by the medium pressure, then the conical end 49 of the tension clamp 41 is pressed farther into the housing recess, and therewith the tube 44 is surrounded and held even tighter by the tension clamp 41. If the blocking member 40 is brought from the flow position into the blocking position, then, by means of a spring action of the sealing ring 42, the tension clamp 41 is pressed outwardly into a recess in the coupling socket. Thereby, the tension clamp 41 releases the tube 44 and the tube 44 can be pulled out of the tension clamp 41. Many tube types are too soft or unstable for fitting as described above. They can be deformed by the sealing element 42 or by the tension clamp 41 and therefore do not seal correctly. Such tubes can be reinforced by a bush 43. The bush 43 has an external diameter which corresponds to an internal diameter of the tube. The bush 43 is pushed into the tube and therewith the tube end receives a sufficient rigidity, in order to keep the tube sealingly in the blocking member 40 together with the sealing element 42 and with the tension clamp 41.

I claim:

1. In a plug-in safety coupling for pressure lines having a coupling socket (1), a blocking member (3, 40) pivotally mounted within said coupling socket (1), said blocking member (3, 40) having a through bore, and a plug (2), the improvement comprising: said blocking member (3, 40) being lockable against pivoting at least in a flow position by at least one cam (67), said at least one cam (67) engaging at least one cavity (68, 69, 70) in said blocking member (3, 40), an adapter (4, 22, 26, 31) having a through bore, said adapter (4, 22, 26, 31) form-lockingly and sealingly fitting into said through bore of said blocking member (3), said adapter (4, 22, 26, 31) further having an interior shaped to sealingly match an exterior of said plug (2) which can be inserted in said adapter (4, 22, 26, 31) for pressureless coupling and uncoupling.

2. In a plug-in safety coupling according to claim 1, wherein said at least one cam (67) is seated on a ring (60), said ring (60) arranged at said coupling socket (1) and spring loaded axially displaceably against the coupling socket (1), said ring (60) having an edge facing towards said coupling socket (1), said at least one cam attached to and projecting beyond said edge, said coupling socket (1) having at least one recess through which said at least one cam (67) can engage said at least one cavity (68, 69, 70), said at least one cavity (68, 69, 70) positioned in a circumferential portion of said blocking member (3), so that when said at least one cam (67) engages said at least one cavity (68, 69, 70), said blocking member (3) is secured in a respective position depending on the pivotal position of said blocking member (3).

3. In a plug-in safety coupling according to claim 2 wherein said through bore in said blocking member (3) in an upper portion of said blocking member (3) has a larger diameter than said through bore in a lower portion of said blocking member (3), said blocking member having an internal edge at a transition from said upper portion to said lower portion, said lower portion of said blocking member having internal threads (14), said blocking member (3) further comprising a sealing ring (16), seated on said edge, said adapter (4) further comprising a threaded nipple (5) having a socket head nut passing through it, said nipple (5) threadedly engaging said internal threads of said blocking member (3).

4. In a plug-in safety coupling according to claim 2, wherein said through bore in said blocking member (3) is step shaped, said adapter (26) having an external surface which matches and closely fits said step shaped through bore, said external surface having an annular groove (27) into which a sealing ring (28) is seated for sealing off and clamping of the adapter (26) in the blocking member (3).

5. In a plug-in safety coupling according to claim 2, wherein said adapter (22) has a projection portion which, when engaged with said blocking member (3), projects out of said blocking member (3), said protection portion comprising two webs (23, 24) made of jacket segments of the adapter (22) located opposite the pivotal direction of said blocking member (3), and a torus shaped ring (25) attached to said webs (23, 24), said torus shaped ring (25) acting as a guide for said plug (2) to be inserted.

6. In a plug-in safety coupling according to claim 5, wherein said adapter (4, 22, 26, 31) further comprises a spring loaded pin (7) axially positioned adjacent an external surface of said adapter (4, 22), said blocking member (3) further comprising a slot (8) for receiving said spring loaded pin (7), said spring loaded pin (7) having a beveled head which, in the decoupled condition of the coupling projects slightly into an interior of said adapter (4, 22, 26, 31) and projects axially into a recess (10) in said coupling socket (1), such that said pin (7) locks said blocking member (3), whereby the locking is releasable by the insertion of said plug (2), which thereby takes said pin (7) along and therewith presses the blocking member surface snugly into its slot (8).

7. In a plug-in safety coupling according to claim 6, wherein said adapter (4, 22, 26, 31) further comprises a cylindrical nipple (34) positioned within said through bore of said adapter (4, 22, 26, 31), an exterior surface of said cylindrical nipple and an internal surface of said adapter (4, 22, 26, 31) defining an annular groove (32) said cylindrical nipple (34) having an annular recess (36) in which a sealing element (37) is positioned, said cylindrical nipple (34) and sealing element (37) for sealingly receiving a plug (33).

8. In a plug-in safety coupling according to claim 7 wherein said adapter comprises a sleeve (39), said sleeve (39) having an annular groove (27, 29), into which a sealing ring (20; 30; 37) is inserted, and said plug (2, 33) having a corresponding sealing surface.

9. In a plug-in safety coupling according to claim 8 wherein said sleeve has a sealing surface and said associated plug has an annular groove on an external surface into which a sealing ring is inserted.

10. In a plug-in safety coupling according to claim 5, wherein said webs (23, 24) further comprise a larger web (24) and a smaller web (23), said smaller web (23) in a coupled condition pivoting into a suitably dimensioned recess (13) in said coupling socket (1), and thus stabilizing the projection portion of said adapter (22).

11. In a plug-in safety coupling according to claim 2, wherein said through bore in said blocking member (40) in an upper portion of said blocking member (40) has a larger diameter than said through bore in a lower portion of said blocking member (40), said blocking member having a shoulder (48) at a transition from said upper portion to said lower portion, and wherein a sleeve (39) is inserted into said through bore, said sleeve (39) being spring loaded on said shoulder (48) formed by said step in said blocking member (40), said step defining a Larger diameter bore and a small diameter bore, said smaller diameter bore having a circular groove (46) into which a sealing ring (42) is inserted for sealing off said blocking member (40) relative to said plug (33).

12. In a plug-in safety coupling according to claim 2, wherein an end portion of a tube (44) acts as a plug of said coupling, said adapter (4, 22, 26, 31) comprising a tension clamp (41) said blocking member (40) further comprising a shoulder (48), an internal annular groove in a lower portion of said blocking member (40), and a sealing ring (42) positioned in said annular groove, said tension clamp (41) sealingly resting on said sealing ring (42) and spring loadedly abutting said shoulder (48), said coupling socket (1) shaped internally such that pivoting said blocking member (40) into a flow position causes said tension clamp (41) to be pressed further into said blocking member (40), whereby said sealing ring (42) sealingly surrounds said tube (44).

13. In a plug-in safety coupling according to claim 1 wherein said through bore in said blocking member (3) in an upper portion of said blocking member (3) has a larger diameter than said through bore in a lower portion of said blocking member (3), said blocking member having an internal edge at a transition from said upper portion to said lower portion, said lower portion of said blocking member having internal threads (14), said blocking member (3) further comprising a sealing ring (16), seated on said edge, said adapter (4, 22, 26, 31) further comprising a threaded nipple (5) having a socket head nut passing through it, said nipple (5) threadedly engaging said internal threads of said blocking member (3).

14. In a plug-in safety coupling according to claim 1, wherein said through bore in said blocking member (3) is step shaped, said adapter (4, 22, 26, 31) having an external surface which matches and closely fits said step shaped through bore, said external surface having an annular groove (27) into which a sealing ring (28) is seated for sealing off and clamping of the adapter (4, 22, 26, 31) in the blocking member (3).

15. In a plug-in safety coupling according to claim 1, wherein said adapter (4, 22, 26, 31) has a projection portion which, when engaged with said blocking member (3), projects out of said blocking member (3), said projection portion comprising two webs (23, 24) made of jacket segments of the adapter (4, 22, 26, 31) located opposite the pivotal direction of said blocking member (3), and a torus shaped ring (25) attached to said webs (23, 24), said torus shaped ring (25) acting as a guide for said plug (2) to be inserted.

16. In a plug-in safety coupling according to claim 1, wherein said adapter (4, 22, 26, 31) further comprises a spring loaded pin (7) axially positioned adjacent an external surface of said adapter (4, 22, 26, 31), said blocking member (3) further comprising a slot (8) for receiving said spring loaded pin (7), said spring loaded pin (7) having a beveled head which, in the decoupled condition of the coupling projects slightly into an interior of said adapter (4, 22, 26, 31) and projects axially into a recess (10) in said coupling socket (1), such that said pin (7) locks said blocking member (3), whereby the locking is releasable by the insertion of said plug (2), which thereby takes said pin (7) along and therewith presses the blocking member surface snugly into its slot (8).

17. In a plug-in safety coupling according to claim 1, wherein said adapter (4, 22, 26, 31) further comprises a cylindrical nipple (34) positioned within said through bore of said adapter (4, 22, 26, 31), an exterior surface of said cylindrical nipple and an internal surface of said adapter (4, 22, 26, 31) defining an annular groove (32) said cylindrical nipple (34) having an annular recess (36) in which a sealing element (37) is positioned, said cylindrical nipple (34) and sealing element (37) for sealingly receiving a plug (33).

18. In a plug-in safety coupling according to claim 1 wherein said adapter (4, 22, 26, 31) comprises a sleeve (39), said sleeve (39) having an annular groove (27, 29), into which a sealing ring (20; 30; 37) is inserted, and said plug (2; 33) having a corresponding sealing surface.

19. In a plug-in safety coupling according to claim 18 wherein said sleeve has a sealing surface and said associated plug has an annular groove on an external surface into which a sealing ring is inserted.

20. In a plug-in safety coupling according to claim 1, wherein said through bore in said blocking member (40) in an upper portion of said blocking member (40) has a larger diameter than said through bore in a lower portion of said blocking member (40), said blocking member having a shoulder (48) at a transition from said upper portion to said lower portion, and wherein a sleeve (39) is inserted into said through bore, said sleeve (39) being spring loaded on said shoulder (48) formed by said step in said blocking member (40), said step defining a larger diameter bore and a small diameter bore, said smaller diameter bore having a circular groove (46) into which a sealing ring (42) is inserted for sealing off said blocking member (40) relative to said plug (33).

21. In a plug-in safety coupling according to claim 1, wherein an end portion of a tube (44) acts as a plug of said coupling, said adapter (4, 22, 26, 31) comprising a tension clamp (41) said blocking member (40) further comprising a shoulder (48), an internal annular groove in a lower portion of said blocking member (40), and a sealing ring (42) positioned in said annular groove, said tension clamp (41) sealingly resting on said sealing ring (42) and spring loadedly abutting said shoulder (48), said coupling socket (1) shaped internally such that pivoting said blocking member (40) into a flow position causes said tension clamp (41) to be pressed further into said blocking member (40), whereby said sealing ring (42) sealingly surrounds said tube (44).

* * * * *